(12) United States Patent
Aleksic et al.

(10) Patent No.: US 9,502,032 B2
(45) Date of Patent: Nov. 22, 2016

(54) DYNAMICALLY BIASING LANGUAGE MODELS

(71) Applicant: Google Inc., Mountain View, CA (US)

(72) Inventors: Petar Aleksic, Jersey City, NJ (US); Pedro J. Moreno Mengibar, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/525,826

(22) Filed: Oct. 28, 2014

(65) Prior Publication Data

US 2016/0104482 A1 Apr. 14, 2016

Related U.S. Application Data

(60) Provisional application No. 62/061,501, filed on Oct. 8, 2014.

(51) Int. Cl.
| | |
|---|---|
| *G10L 15/26* | (2006.01) |
| *G10L 15/22* | (2006.01) |
| *G10L 15/18* | (2013.01) |
| *G10L 19/00* | (2013.01) |

(52) U.S. Cl.
CPC ........... *G10L 15/22* (2013.01); *G10L 15/1815* (2013.01); *G10L 15/26* (2013.01); *G10L 19/00* (2013.01)

(58) Field of Classification Search
CPC ...... G10L 15/26; G10L 15/005; G06F 17/28
USPC ........................................................ 704/235
See application file for complete search history.

(56) References Cited

U.S. PATENT DOCUMENTS

| | | | | |
|---|---|---|---|---|
| 5,349,645 | A * | 9/1994 | Zhao | G10L 15/142 704/243 |
| 6,574,597 | B1* | 6/2003 | Mohri | G10L 15/183 704/251 |
| 7,058,573 | B1 | 6/2006 | Murveit et al. | |
| 7,184,957 | B2 | 2/2007 | Brookes et al. | |
| 7,286,984 | B1* | 10/2007 | Gorin | G10L 15/08 704/243 |
| 7,319,960 | B2* | 1/2008 | Riis | G10L 15/08 704/232 |
| 7,567,868 | B2* | 7/2009 | Rusanen | B66B 1/34 187/396 |
| 7,567,903 | B1* | 7/2009 | Goffin | G10L 15/12 704/234 |
| 7,996,224 | B2 | 8/2011 | Bacchiani et al. | |
| 8,041,566 | B2 | 10/2011 | Peters et al. | |
| 8,606,581 | B1 | 12/2013 | Quast et al. | |
| 8,775,177 | B1 | 7/2014 | Heigold et al. | |
| 8,918,317 | B2* | 12/2014 | Fritsch | 704/235 |
| 9,047,868 | B1* | 6/2015 | O'Neill | G10L 15/197 |
| 2004/0186714 | A1* | 9/2004 | Baker | G10L 15/08 704/236 |
| 2007/0156403 | A1* | 7/2007 | Coifman | G10L 15/08 704/252 |
| 2009/0055381 | A1 | 2/2009 | Wu et al. | |
| 2010/0312547 | A1* | 12/2010 | Van Os | G06F 3/167 704/9 |
| 2011/0004462 | A1 | 1/2011 | Houghton et al. | |
| 2011/0077943 | A1 | 3/2011 | Miki et al. | |
| 2011/0161081 | A1 | 6/2011 | Ballinger et al. | |

(Continued)

*Primary Examiner* — Jakieda Jackson
(74) *Attorney, Agent, or Firm* — Fish & Richardson P.C.

(57) ABSTRACT

Methods, systems, and apparatus, including computer programs encoded on a computer storage medium, for speech recognition. In one aspect, a method comprises receiving audio data encoding one or more utterances; performing a first speech recognition on the audio data; identifying a context based on the first speech recognition; performing a second speech recognition on the audio data that is biased towards the context; and providing an output of the second speech recognition.

20 Claims, 5 Drawing Sheets

(56) References Cited

U.S. PATENT DOCUMENTS

2012/0059813 A1* 3/2012 Sejnoha ............ G06F 17/30637 707/707
2012/0259632 A1* 10/2012 Willett .................... G10L 15/02 704/234
2013/0144597 A1* 6/2013 Waibel .................... G06F 17/28 704/2
2013/0346078 A1 12/2013 Gruenstein et al.
2014/0163981 A1* 6/2014 Cook ...................... G10L 15/26 704/235

* cited by examiner

DYNAMICALLY BIASING LANGUAGE MODELS

CROSS-REFERENCE TO RELATED APPLICATIONS

This application claims priority to U.S. Provisional Application Ser. No. 62/061,501, filed Oct. 8, 2014, the entire contents of which are hereby incorporated by reference.

BACKGROUND

This specification relates to automated speech recognition.

A user of a mobile device or other computer may enter text by, for example, speaking into a microphone. The mobile device records audio data from the microphone while the user is speaking and can then use an Automated Speech Recognition (ASR) engine to create a transcription of the user's utterances. The mobile device can then execute commands specified by the transcription or perform other actions based on the transcription. The ASR engine can be implemented as middleware so that the resulting transcription can be passed to user applications.

SUMMARY

A multi-pass speech recognition system determines whether to bias later passes of speech recognition based on results of earlier passes of speech recognition. The system can analyze a recognition lattice produced from a first round of speech recognition to determine whether a general language model is combined with a context-specific language model that matches the recognition lattice in a second round of speech recognition.

In general, one innovative aspect of the subject matter described in this specification can be implemented in methods that include a computer-implemented method for providing sound transcription. One method comprises receiving audio data encoding one or more utterances; generating a recognition lattice of the utterances by performing speech recognition on the audio data using a first pass speech recognizer; determining a specific context for the utterances based on the recognition lattice; in response to determining that the recognition lattice defines the specific context, generating a transcription of the utterances by performing speech recognition on the audio data using a second pass speech recognizer biased towards the specific context defined by the recognition lattice; and providing an output of the transcription of the utterances. Another method comprises receiving audio data encoding one or more utterances; performing a first speech recognition on the audio data; identifying a context based on the first speech recognition; performing a second speech recognition on the audio data that is biased towards the context; and providing an output of the second speech recognition. Other embodiments of this aspect include corresponding systems, apparatus, and computer programs, configured to perform the actions of the methods, encoded on computer storage devices. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

These and other implementations can each optionally include one or more of the following features. Generating the recognition lattice comprises generating one or more text phrases that acoustically match the utterances according to a first language model. Determining that the recognition lattice defines the specific context for the utterances comprises performing semantic analysis on the text phrases. Determining that the recognition lattice defines the specific context comprises determining that at least a first text phrase matches a first title of a first context language model of a plurality of context language models, wherein the first context language model comprises a biasing language model for the specific context. Determining that the recognition lattice defines the specific context comprises supplying the recognition lattice to a classifier trained using recognition lattice data. Performing speech recognition on the audio data using a second pass speech recognizer biased towards the specific context defined by the recognition lattice comprises: selecting a context language model for the specific context, the context language model specifying a plurality of potential output phrases associated with the specific context, wherein the number of potential output phrases is fewer than a number of potential output phrases of a general language model; supplying the context language model, the general language model, and the audio data to an automatic speech recognition engine. The method comprises supplying respective weights for the context language model and the general language model to the automatic speech recognition engine based on the recognition lattice. Supplying the context language model and the general language model to the automatic speech recognition engine comprises combining the context language model and the general language model into a combined language model and supplying the combined language model to the automatic speech recognition engine. The method comprises supplying the recognition lattice to the automatic speech recognition engine.

The details of one or more implementation of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
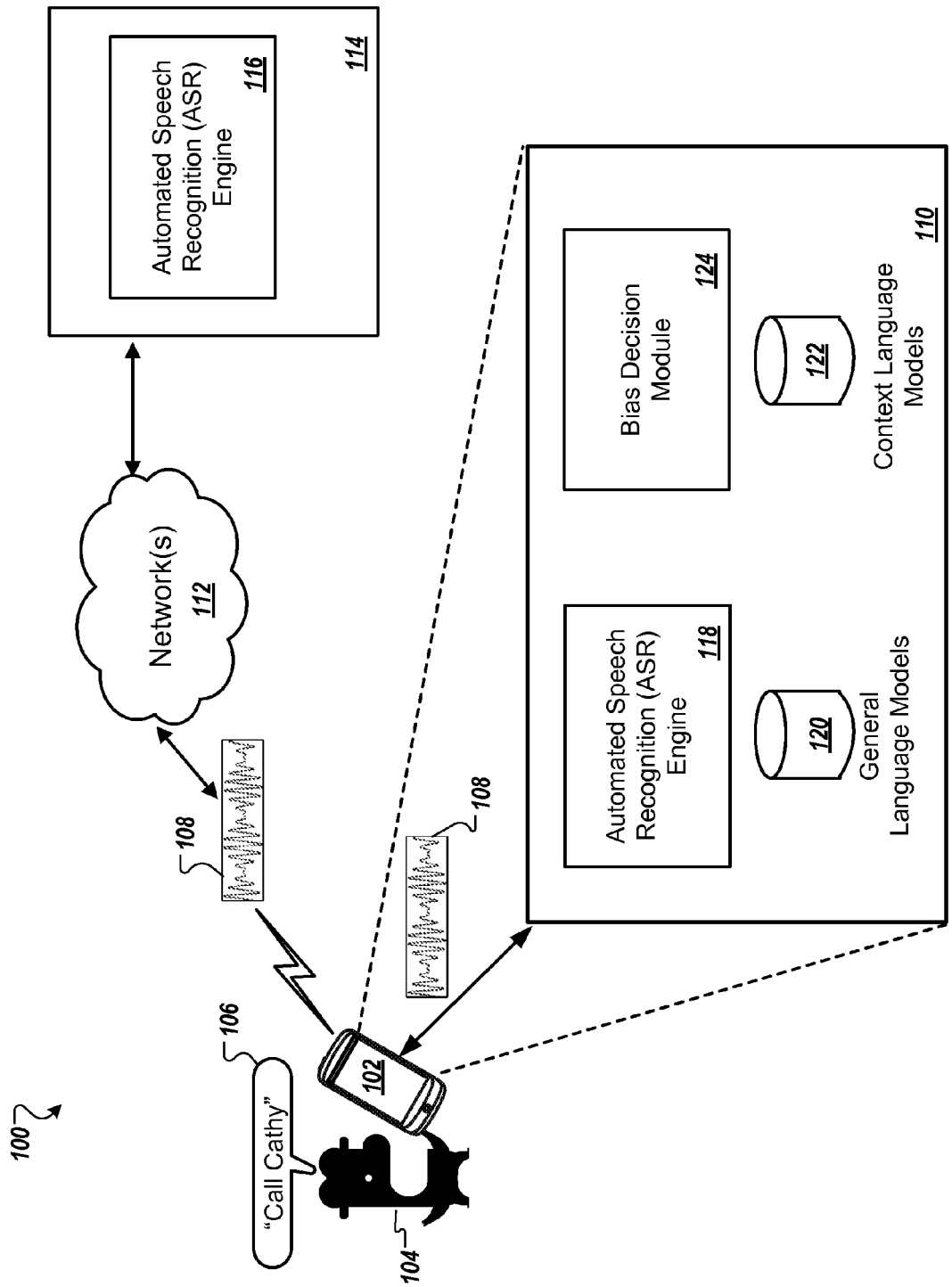
FIG. 1 is a diagram of an example system for speech recognition.

FIG. 1 is a diagram of an example system 100 for speech recognition. The system includes a mobile device 102 that records an utterance 106 from a user 104 as audio data 108. The mobile device 102 is shown for purposes of illustration;

various other user computing system could perform the actions of the mobile device 102. The mobile device 102 may be, for example, a cellular telephone, a smartphone, a tablet computer, a wearable computer, or a personal digital assistant (PDA).

The mobile device 102 comprises a microphone and a system 110 of one or more computers. The microphone receives the utterance 106 of the user 104, and the mobile device 102 generates audio data 108 representing the utterance 106. The computer system 110 on the mobile device 102 includes several software modules to perform speech recognition using the audio data 108.

In some implementations, the mobile device 102 communicates the audio data 108 over a data communications network 112, e.g., the Internet, to a server system 114 of one or more computers that performs speech recognition, e.g., using a remote automated speech recognition engine (ASR) 116. In some other implementations, some or all of the speech recognition is performed on the mobile device 102. For purposes of illustration, this document will describe the speech recognition as being performed by the mobile device 102.

The computer system 110 of the mobile device 102 includes a local ASR engine 118 and a bias decision module 124. The ASR engine 118 is configured to perform speech recognition, e.g., using any appropriate speech recognition technique. The computer system 110 is configured to perform multi-pass speech recognition. The bias decision module 124 is configured to determine whether or not the computer system 110 will apply a bias to later passes of speech recognition based on the results of earlier passes of speech recognition.

The computer system includes one or more general language models 120 and one or more context language models 122. A language model assigns probabilities to text sequences. For example, in ASR, the relative probabilities among several potential text sequences as assigned by the language model can be used to help select the most likely interpretation of a user's utterance.

General language models are typically trained with large amounts of text data and therefore tend to be generic. This is useful, e.g., because the general language models can be used in a wide variety of situations and can work well without information in addition to the audio data. However, in order to use general language models in real time or near real time ASR, the size of the models may need to be limited to avoid large latencies in processing that would be unacceptable to users. Moreover, as the context of the recognition changes, general language models may not fit the context very well because they are precompiled, which can reduce the quality of the recognition results.

Context language models are language models that are biased to a set of expected phrases. A context language model can also be referred to as a "grammar." In some contextual situations, there is a high probability that the user 104 will utter one of a certain number of predicted phrases. For example, suppose that the mobile device 102 prompts the user 104 with a menu having the options "yes/no/cancel." In that contextual situation it is likely that the user will utter one of those three options, and introducing a context language model can improve the quality of the recognition result.

The context language models 122 can be topic specific, user specific, action specific, or the like. The context language models 122 can be based on user-specific data saved on the mobile device 102. User-specific data may include, for example, contact lists, phone numbers, addresses, applications, digital photographs, audio media, or video media. By incorporating the user-specific data into a context language model, the ASR 118 may be able to more accurately distinguish unique words and names describing the data such as a friend's name, "Cathy," from other common choices, e.g., "Kathy."

The context language models 122 may be less useful in contextual situations where the probability of the user saying an expected phrase is lower. For example, suppose that the user has just searched for Italian restaurants. The system 110 can predict, e.g., using a trained classifier, that there is a 1% probability that the next query from the user will be a search query for locations of restaurants near him. In this more speculative contextual situation, using a context language model biased to the low probability expected phrases can reduce the quality of recognition results, e.g., if the user does not say one of the expected phrases.

So, there may be some contextual situations where the general language model does not fit the context well, and the system cannot predict expected phrases with a probability greater than a threshold. In those contextual situations and other possible situations, the system can improve recognition results using the bias decision module 124 and multi-pass speech recognition. The system uses a general language model in the first pass, producing a recognition lattice that can include the most likely paths through the general language model based on, e.g., acoustic and language model scores. The bias decision module 124 analyzes the recognition lattice and determines whether to use a context language model in a second pass. If indicated by the bias decision module 124, the system then uses the context language model in the second pass. This multi-pass technique is described further below with reference to FIGS. 2-4.

In some implementations, the system 110 employs speech recognition to determine whether speech input is a voice command or a voice search query, and then uses the results of the determination to act accordingly. A voice command may be a user utterance that is received by a speech recognition device and causes the device to perform a task. The voice command may be recognized by the inclusion, in the utterance, of a word or phrase describing an action that is performable by the device, for example "call."

In some cases, the voice action may be described by multiple variations of such action. For example variations on the action "call" incorporating user data may be "call Cathy," "call Cathy at home," or "please dial 555-321-4567." Alternative types of commands may be to play, pause, or stop audio or video media; open or close an application; send, open, delete or save and e-mail or SMS, get a map, directions or otherwise navigate to a location; open, zoom, save, or capture a digital photograph; set, stop, or start an alarm or timer; or to set or schedule a reminder or a task.

A voice search query may be a user utterance that is received by a speech recognition device and causes the device to perform a search based on a transcription of the utterance. The search may be a web search, an address search, a telephone directory search, a map search, or any other type of search. Such an utterance may be distinguished from a voice command by the lack of a word or phrase relating to an action performable by a mobile device or by the inclusion of certain words or phrases indicative of a search query, for example "search . . . ," "what is . . . ," "where is . . . " In the context of a voice search query system, a "search query" includes one or more query terms that a user submits to a search engine when the user requests the search engine to execute a search query, where a "term" or a "query term" includes one or more whole or partial words, characters, or strings of characters. Among other things, a "result" (or a "search result") of the search query includes a Uniform Resource Identifier (URI) that references a resource that the search engine determines to be responsive to the search query. The search result may include other things, such as a title, preview image, user rating, map or directions, description of the corresponding resource, or a snippet of text that has been automatically or manually extracted from, or otherwise associated with, the corresponding resource.

After performing speech recognition, the system 110 can request user confirmation of the received transcriptions, request confirmation of the action before initiating performance, or initiate performance of the action without user confirmation.

Figure 2:
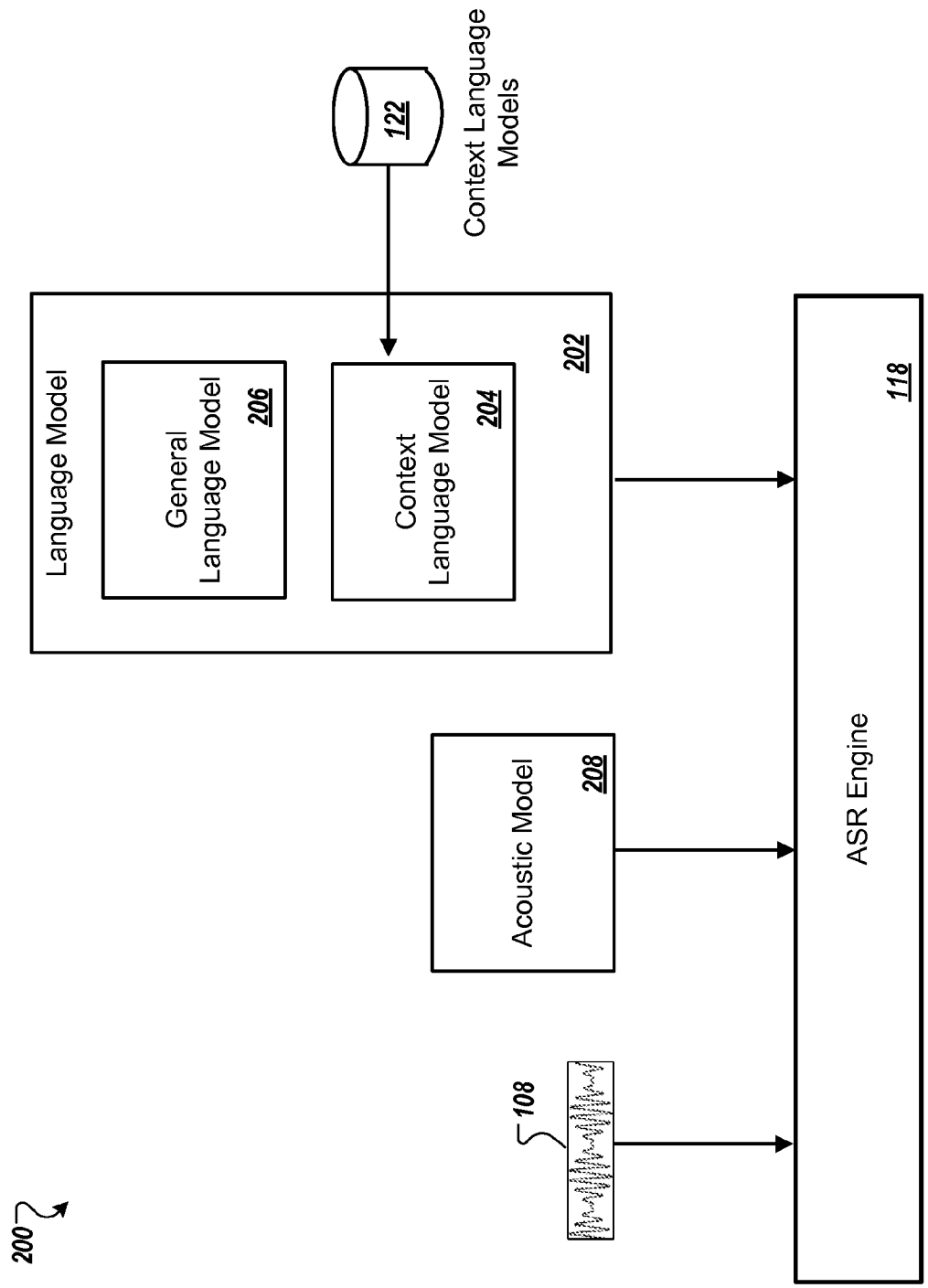
FIG. 2 is a block diagram of a system for performing speech recognition using a speech recognized biased towards a specific context.

FIG. 2 is a block diagram of a system 200 for performing speech recognition using a speech recognized biased towards a specific context. The system includes an ASR engine 118 that receives audio data 108 and data from an acoustic model 208 and a language model 202.

The acoustic model 208 can be created using audio recordings of speech and respective transcriptions for the audio recordings. The transcriptions can be taken from a speech corpus. The recordings and transcriptions are compiled into statistical representations of the acoustics that constitute words and phrases. For example, they can be compiled by training a classifier. The ASR engine 118 uses the acoustic model 208 and the language model 202 to perform speech recognition.

The system creates the language model 202 by adding the context language model 204, which is selected from the repository of context language models, to a general language model 206. The context language model 204 can be weighted with the general language model, e.g., so that system gives a higher weight to the context language model 204 when the system determines, e.g., using machine learning techniques, that there is a higher probability that the user's utterance will be specified by the context language model 204. In some implementations, multiple context language models can be added.

Figure 3:
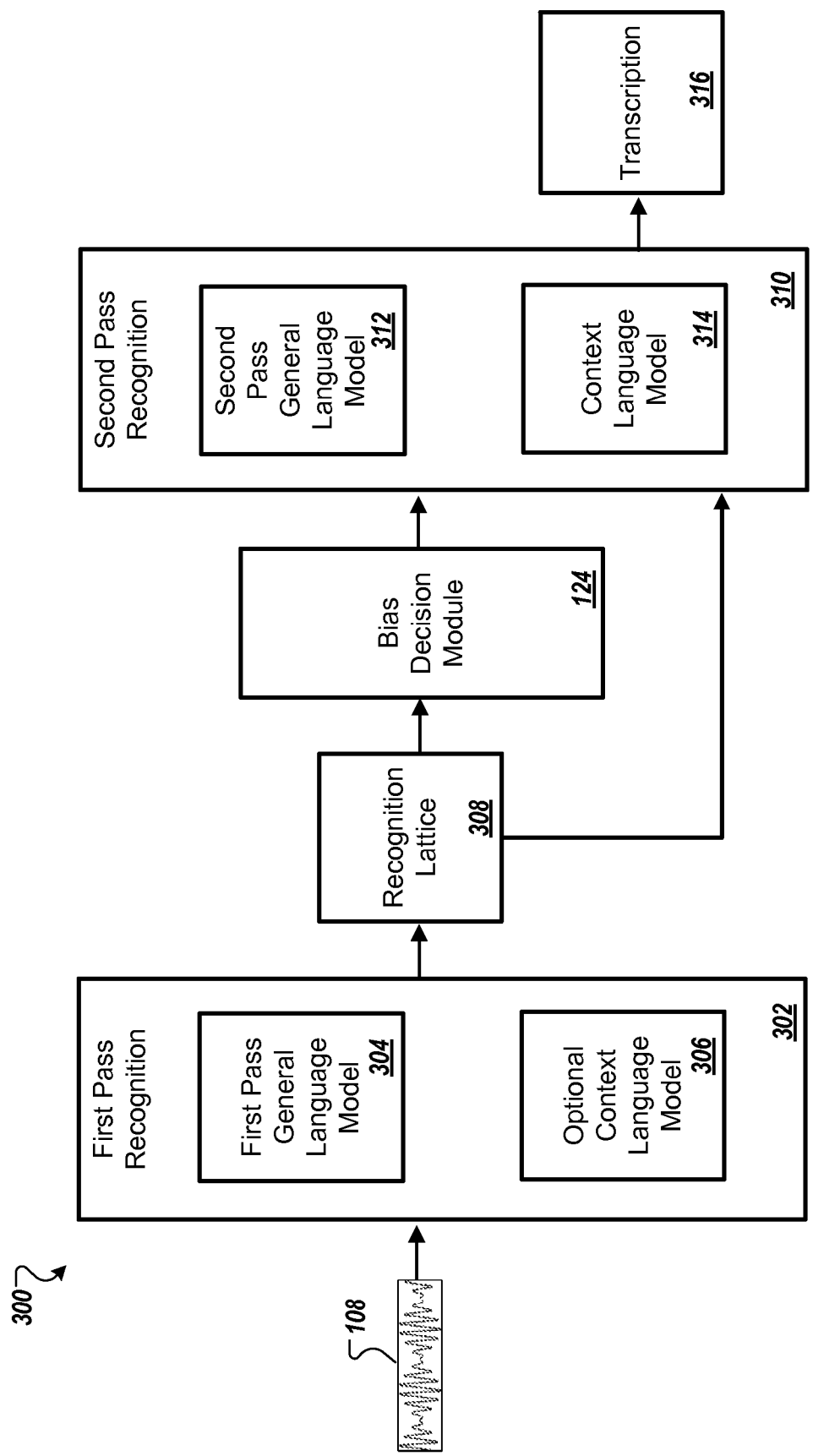
FIG. 3 is a block diagram illustrating a multi-pass speech recognition system.

FIG. 3 is a block diagram illustrating a multi-pass speech recognition system.

A first pass speech recognition block 302 receives the audio data 108 and performs speech recognition using a first pass general language model 304. The first pass speech recognition block 302 can optionally use a first context language model 306, e.g., by combining the first context language model 306 with the first pass general language model 304 as described above with reference to FIG. 2. For example, the first context language model 306 can be using to lightly bias the first pass speech recognition to some expected phrases or to boost a small subset of n-grams corresponding to biasing phrases, e.g., with a weight that is small enough to just make sure that the words and n-grams are part of the first pass general language model 304.

The first pass speech recognition block 302 outputs a recognition lattice 308. The recognition lattice 308 include a number of results of the most likely paths through the language model—which could be the first pass general language model 304 or a combination with the optional context language model 306—based on acoustic and language model scores. Each result can include a candidate transcription of the audio data and a score for the candidate transcription indicating the quality of the candidate transcription, e.g., a probability that the candidate transcription will be considered correct according to the user.

The bias decision module 124 analyzes the recognition lattice to determine whether a second pass recognition block 310 will use a second context language model 314 in addition to a second pass general language model 312. The second pass general language model 312 can be the same general language model as the first pass general language model 304 or a different general language model.

The bias decision module 124 analyzes the recognition lattice to determine whether the results of the recognition lattice match the available context language models, e.g., stored in the repository of context language models 122 in FIG. 1. For example, the bias decision module 124 can search the recognition lattice for n-grams that match a title of a context language model or an n-gram specified within a context language model. The bias decision module 124 can determine that an n-gram matches another n-gram if, for example, the n-grams are identical, or the n-grams are within a threshold edit distance from each other, or the n-grams are within a threshold semantic distance from each other. For purposes of illustration, consider the following three examples.

In a first example, suppose that the user says "call Cathy," and that the first pass speech recognition produces a recognition lattice with a top result of "call Kathy" and a lower result of "call Cathy." The user may only have "Cathy" in a list of contacts stored on the mobile device 102. The bias decision module 124 searches the recognition lattice and finds the term "call" which matches a context language model for the user's contact list.

The bias decision module 124 then causes the second pass speech recognition block 310 to use a language model based on both the second pass general language model 312 and the second context language model 314 for the user's contact list. Because the second pass speech recognition was biased towards the second context language model 314 for the user's contact list, the top result from the second pass speech recognition can be "call Cathy," resulting in an output transcription 316 of "call Cathy." The mobile device 102 can successfully complete the command for "call Cathy" by finding the entry for Cathy in the user's contact list and dialing the associated phone number. Without the biasing in the second pass speech recognition, the resulting output transcription 316 may have been "call Kathy," which the mobile device 102 cannot successfully complete because the use has only "Cathy" in the list contacts.

In a second example, suppose that the user says "open UncommonApp." The word "UncommonApp" may not be in the first pass general language model 304, resulting in a recognition lattice 308 with results that include "open" but not "UncommonApp." The bias decision model 124 searches the recognition lattice and finds the term "open" which matches a context language model for applications installed on the user's device. The bias decision module 124 then causes the second pass speech recognition block 310 to use a language model based on both the second pass general language model 312 and the second context language model 314 for the user's installed applications. Because the second pass speech recognition was biased towards the second context language model 314 for the user's installed applications, the top result from the second pass speech recognition can be "open UncommonApp," resulting in an output transcription 316 of "open UncommonApp," and resulting in the mobile device 102 opening that application.

In a third example, suppose that the user says "directions to NewLocalRestaurant." The word "NewLocalRestaurant" may not be in the first pass general language model 304, resulting in a recognition lattice 308 with results that include "directions to" but not "NewLocalRestaurant." The bias decision model 124 searches the recognition lattice and finds the term "directions to" which matches a context language model for locations in the user's city. The bias decision module 124 then causes the second pass speech recognition block 310 to use a language model based on both the second pass general language model 312 and the second context language model 314 for locations in the user's city. Because the second pass speech recognition was biased towards the second context language model 314, the top result from the second pass speech recognition can be "directions to New-LocalRestaurant," resulting in an output transcription 316 of "directions to NewLocalRestaurant," and resulting in the mobile device 102 searching for directions to the restaurant.

In some implementations, the bias decision model 124 is implemented using machine learning algorithms, e.g., support vector machines (SVMs) or maximum entropy classifiers. For example, a yes/no classifier can be trained using recognition lattices or features extracted from recognition lattices to decide whether adding a context language model to the second pass recognition will improve recognition results.

If the bias decision module 124 does not find a match to the available context language models, then the second pass recognition can be performed without any biasing. If the bias decision module 124 finds multiple matches to available context language models, then the second pass recognition can be biased to multiple context language models.

Figure 4:
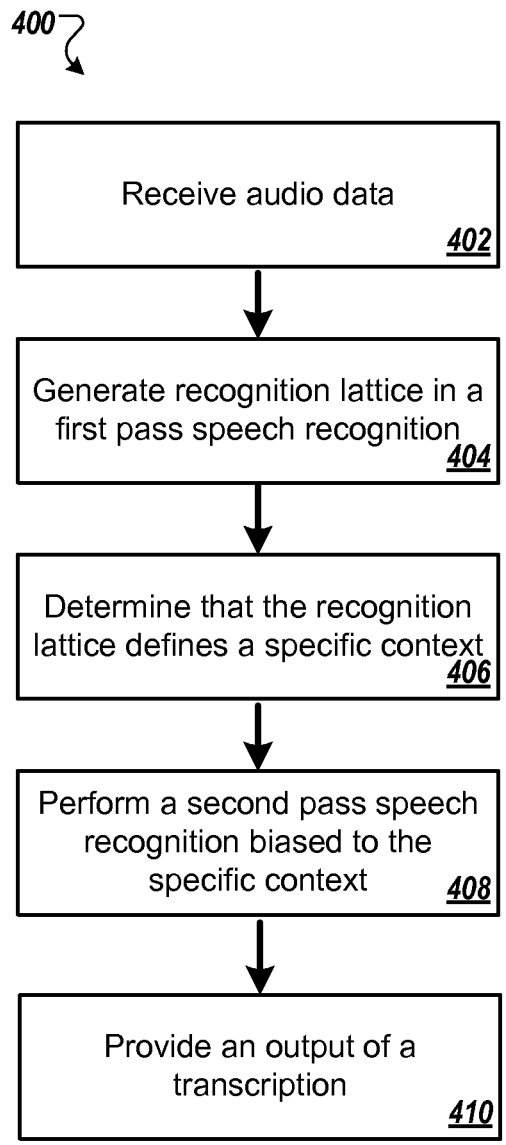
FIG. 4 is a flow diagram of a method for multi-pass speech recognition performed by a system of one or more computers.

FIG. 4 is a flow diagram of a method 400 for multi-pass speech recognition performed by a system of one or more computers, e.g., the mobile device 102 of FIG. 1.

The system receives audio data encoding one or more utterances (402). For example, the system can record the audio data from a microphone in response to a user providing user input to initiate speech recognition.

The system generates a recognition lattice of the utterances by performing speech recognition on the audio data using a first pass speech recognizer (404). Generating the recognition lattice can include generating one or more text phrases that acoustically match the utterances according to a first language model. The recognition lattice can include a score for each of the text phrases.

The system determines that the recognition lattice defines a specific context (406). For example, the system can determine at least a first text phrase in the recognition lattice matches a first title of a first context language model in a repository of context language models. In another example, the system can use a classifier trained using recognition lattice data.

In response to determining that the recognition lattice defines the specific context, the system generates a transcription of the utterances by performing speech recognition on the audio data using a second pass speech recognizer biased towards the specific context defined by the recognition lattice (408). Using the second pass speech recognizer can include selecting a context language model for the specific context and supplying the context language model, a general language model, and the audio data to an ASR engine. Supplying the context language model and the general language model to the ASR engine can include combining the context language model and the general language model into a combined language model and supplying the combined language model to the ASR engine.

In some implementations, the system performs the speech recognition on the audio data using the second pass speech recognizer in parallel with performing the speech recognition using the first pass speech recognizer. Then, after the system completes the first pass speech recognition, the system decides whether or not to use the results of the biased second pass speech recognition based on the output of the first pass speech recognition. This can be useful, e.g., to reduce latency.

The system can also optionally supply the recognition lattice to the ASR engine and/or respective weights for the context language model and the general language model based on the recognition lattice. The context language model can specify a number of potential output phrases associated with the specific context, e.g., phrases from a contact list on the mobile device 102, or phrases from a menu displayed by an application executing on the mobile device 102. The number of potential output phrases in the context language model can be fewer than the number of potential output phrases in the general language model.

The system provides an output of the transcription (410). For example, the system can provide the transcription to an application executing on the system, which can take an action using the transcription.

Figure 5:
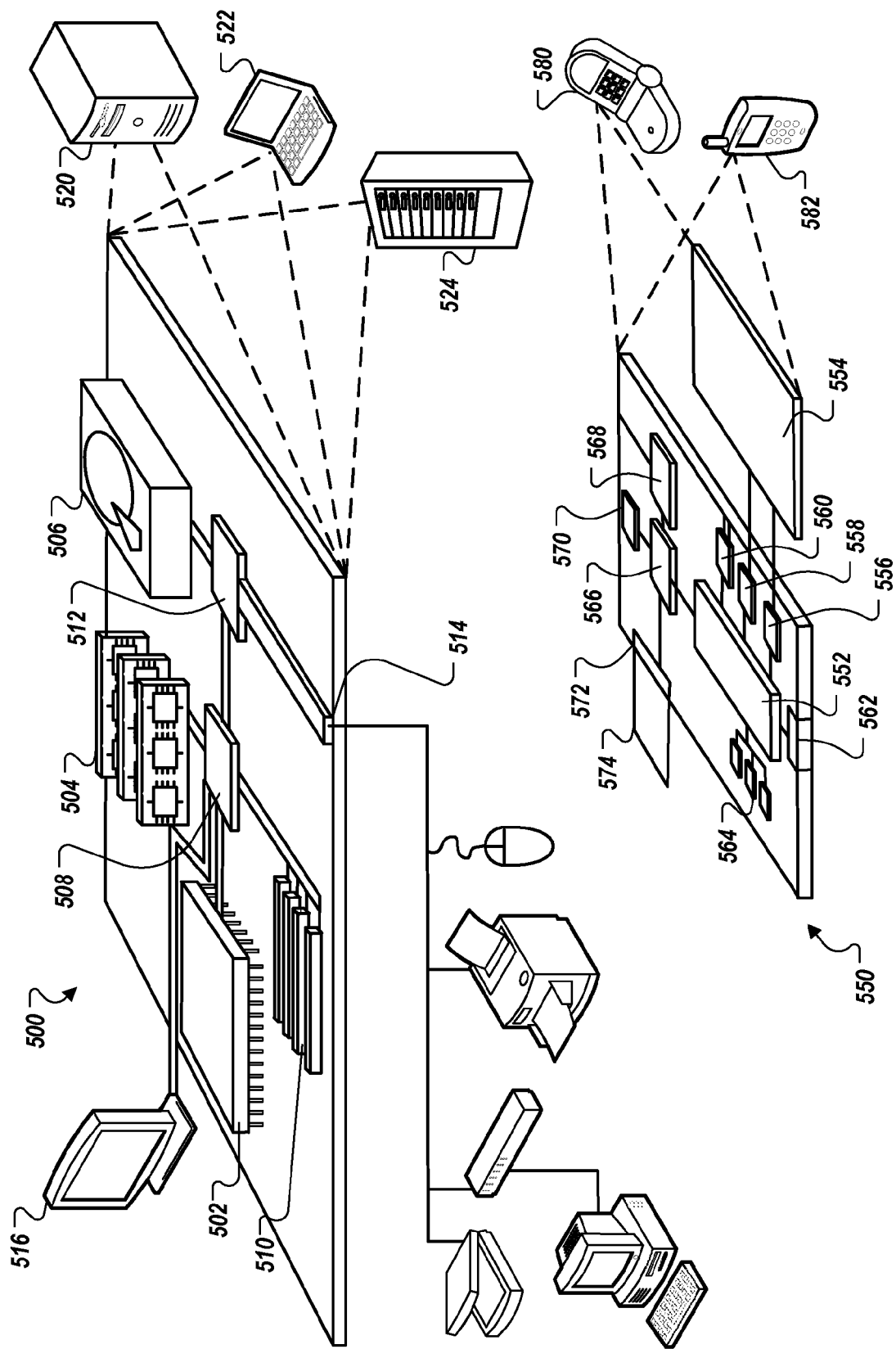
FIG. 5 is a block diagram of example computing devices that may be used to implement a multi-pass speech recognition system.

FIG. 5 is a block diagram of computing devices 500, 550 that may be used to implement the systems and methods described in this document, either as a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, Voice Over LTE (VOLTE) calls, SMS, EMS, or MMS messaging, CDMA, TDMA, PDC, WCDMA, CDMA2000, GPRS, WiMAX, LTE, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communication audibly using audio codec 560, which may receive spoken information from a user and convert it to usable digital information. Audio codex 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to certain tactile input layouts, but other various layouts may also be used.

In addition, the logic flows depicted in the figures do not necessarily require the particular order shown, or sequential order, to achieve desirable results. In addition, other actions may be provided, or actions may be eliminated, from the described flows, and other components may be added to, or removed from, the described systems. Accordingly, other embodiments are within the scope of the following claims.

What is claimed is:

1. A method performed by one or more computers, the method comprising:
   receiving audio data encoding one or more utterances;
   generating a recognition lattice of the one or more utterances by performing speech recognition on the audio data using a first pass speech recognizer;
   identifying a specific context for the one or more utterances that is referenced by the recognition lattice of the one or more utterances, generated by performing speech recognition on the audio data using the first pass speech recognizer, based on semantic analysis of the recognition lattice;
   in response to identifying the specific context that is referenced by the recognition lattice, selecting a second pass speech recognizer that is biased towards the specific context that is referenced by the recognition lattice of the one or more utterances, generated by performing speech recognition on the audio data using the first pass speech recognizer, based on semantic analysis of the recognition lattice;
   in parallel with generating a first transcription of the one or more utterances using the first pass speech recognizer, generating, by an automatic speech recognition engine, a second transcription of the one or more utterances by performing additional speech recognition on the audio data using the second pass speech recognizer that is biased towards the specific context that is referenced by the recognition lattice that was generated by performing speech recognition on the audio data using the first pass speech recognizer; and
   providing an output transcription of one of the first transcription of the one or more utterances or the second transcription of the one or more utterances to initiate an operation based on the output transcription.

2. The method of claim 1, wherein generating the recognition lattice comprises generating one or more text phrases that acoustically match the one or more utterances according to a first language model.

3. The method of claim 2, wherein identifying the specific context that is referenced by the recognition lattice comprises determining that at least a first text phrase matches a first title of a first context language model of a plurality of context language models, wherein the first context language model comprises a biasing language model for the specific context.

4. The method of claim 2, wherein identifying the specific context that is referenced by the recognition lattice comprises supplying the recognition lattice to a classifier trained using recognition lattice data.

5. The method of claim 1, comprising determining whether a second pass speech recognizer that is biased towards the specific context that is referenced by the recognition lattice of the one or more utterances is likely to improve recognition results, based on the semantic analysis of the recognition lattice.

6. The method of claim 1, wherein selecting a second pass speech recognizer that is biased towards the specific context that is referenced by the recognition lattice of the one or more utterances generated by performing speech recognition on the audio data using the first pass speech recognizer based on semantic analysis of the recognition lattice comprises:
   selecting a context language model for the specific context, the context language model specifying a plurality of potential output phrases associated with the specific context, wherein the number of potential output phrases is fewer than a number of potential output phrases of a general language model;

supplying the context language model, the general language model, and the audio data to an automatic speech recognition engine.

7. The method of claim 6, comprising supplying respective weights for the context language model and the general language model to the automatic speech recognition engine based on the recognition lattice.

8. The method of claim 6, wherein supplying the context language model and the general language model to the automatic speech recognition engine comprises combining the context language model and the general language model into a combined language model and supplying the combined language model to the automatic speech recognition engine.

9. The method of claim 1, wherein performing speech recognition on the audio data using a first pass speech recognizer comprises biasing the first pass speech recognizer.

10. The method of claim 1, comprising determining, based on the semantic analysis of the recognition lattice, that the recognition lattice defines an additional context for the one or more utterances, wherein the second pass speech recognizer is biased towards both the specific context and the additional context.

11. A system comprising:
one or more computers; and
one or more storage devices storing instructions that are operable, when executed by the one or more computers, to cause the one or more computers to perform operations comprising:
receiving audio data encoding one or more utterances;
generating a recognition lattice of the one or more utterances by performing speech recognition on the audio data using a first pass speech recognizer;
identifying a specific context for the one or more utterances that is referenced by the recognition lattice of the one or more utterances, generated by performing speech recognition on the audio data using the first pass speech recognizer, based on semantic analysis of the recognition lattice;
in response to identifying the specific context that is referenced by the recognition lattice, selecting a second pass speech recognizer that is biased towards the specific context that is referenced by the recognition lattice of the one or more utterances, generated by performing speech recognition on the audio data using the first pass speech recognizer, based on semantic analysis of the recognition lattice;
in parallel with generating a first transcription of the one or more utterances using the first pass speech recognizer, generating, by an automatic speech recognition engine, a second transcription of the one or more utterances by performing additional speech recognition on the audio data using the second pass speech recognizer that is biased towards the specific context that is referenced by the recognition lattice that was generated by performing speech recognition on the audio data using the first pass speech recognizer; and
providing an output transcription of one of the first transcription of the one or more utterances or the second transcription of the one or more utterances to initiate an operation based on the output transcription.

12. The system of claim 11, wherein generating the recognition lattice comprises generating one or more text phrases that acoustically match the one or more utterances according to a first language model.

13. The system of claim 12, wherein identifying the specific context that is referenced by the recognition lattice comprises determining that at least a first text phrase matches a first title of a first context language model of a plurality of context language models, wherein the first context language model comprises a biasing language model for the specific context.

14. The system of claim 12, wherein identifying the specific context that is referenced by the recognition lattice comprises supplying the recognition lattice to a classifier trained using recognition lattice data.

15. The system of claim 11, comprising determining whether a second pass speech recognizer that is biased towards the specific context that is referenced by the recognition lattice of the one or more utterances is likely to improve recognition results, based on the semantic analysis of the recognition lattice.

16. The system of claim 11, wherein selecting a second pass speech recognizer that is biased towards the specific context that is referenced by the recognition lattice of the one or more utterances generated by performing speech recognition on the audio data using the first pass speech recognizer based on semantic analysis of the recognition lattice comprises:
selecting a context language model for the specific context, the context language model specifying a plurality of potential output phrases associated with the specific context, wherein the number of potential output phrases is fewer than a number of potential output phrases of a general language model;
supplying the context language model, the general language model, and the audio data to an automatic speech recognition engine.

17. The system of claim 16, the operations comprising supplying respective weights for the context language model and the general language model to the automatic speech recognition engine based on the recognition lattice.

18. The system of claim 16, wherein supplying the context language model and the general language model to the automatic speech recognition engine comprises combining the context language model and the general language model into a combined language model and supplying the combined language model to the automatic speech recognition engine.

19. The system of claim 16, wherein performing speech recognition on the audio data using a first pass speech recognizer comprises biasing the first pass speech recognizer.

20. The system of claim 11, the operations comprising determining, based on the semantic analysis of the recognition lattice, that the recognition lattice defines an additional context for the one or more utterances, wherein the second pass speech recognizer is biased towards both the specific context and the additional context.

* * * * *